April 9, 1929.   L. A. MAXSON   1,708,677
HOISTING MECHANISM
Original Filed Jan. 19, 1922
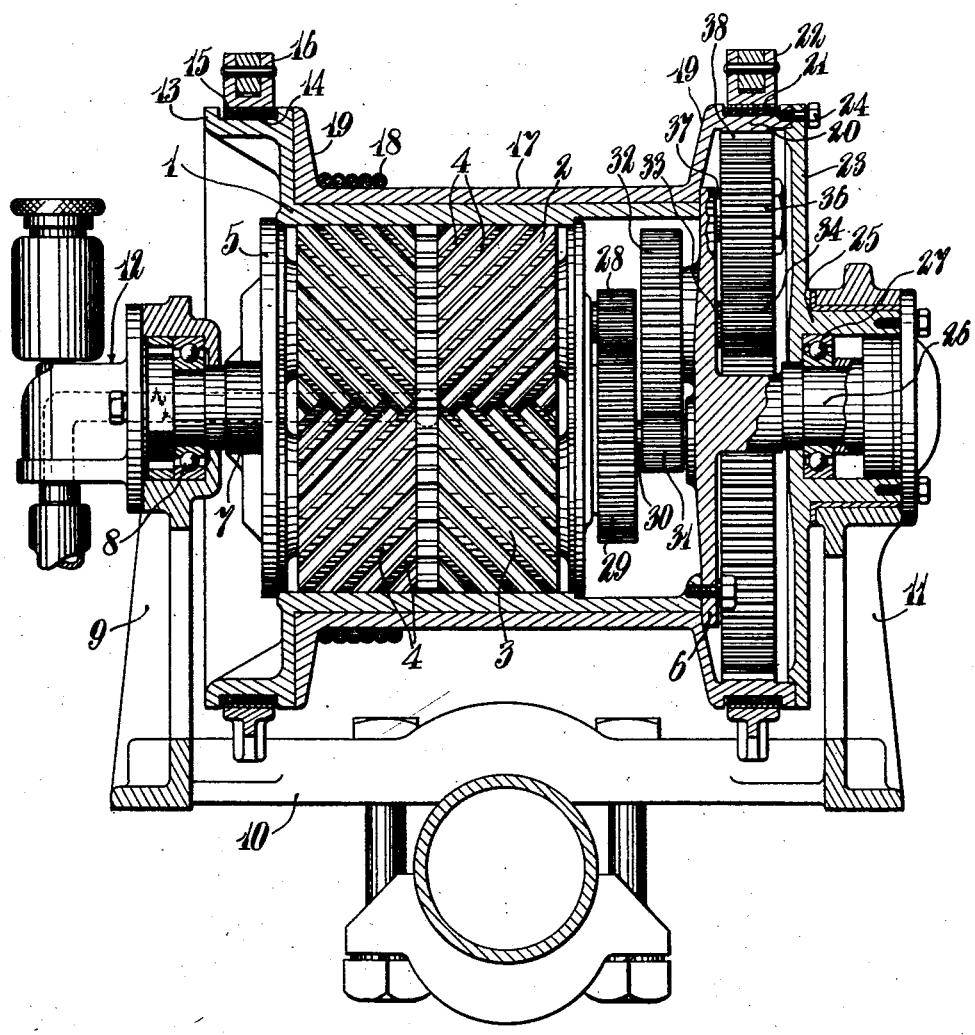
Inventor:
Louis A. Maxson
by
attý.

Patented Apr. 9, 1929.

1,708,677

UNITED STATES PATENT OFFICE.

LOUIS A. MAXSON, OF CLAREMONT, NEW HAMPSHIRE, ASSIGNOR TO SULLIVAN MACHINERY COMPANY, A CORPORATION OF MASSACHUSETTS.

HOISTING MECHANISM.

Application filed January 19, 1922, Serial No. 530,427. Renewed September 20, 1928.

My invention relates to hoisting mechanisms.

An object of my invention is to provide an improved hauling or hoisting mechanism. Another object of my invention is to provide an improved hoisting mechanism of the enclosed motor type. A further object of my invention is to provide an improved hoisting mechanism which shall be compact in form and provide improved controlling means. Other objects and advantages of my invention will hereinafter more fully appear.

In the accompanying drawing I have shown for purposes of illustration one form which my invention may assume in practice.

In this drawing the view is a central vertical section, with parts shown in elevation, through the illustrative embodiment of my hoisting mechanism.

For the purpose of illustrating my improved hoisting mechanism I have shown an illustrative embodiment of the same including a motor housing member 1 which is cylindrical in periphery and which contains a pair of communicating rotor bores in which a pair of intermeshing rotors 2 and 3 are rotatably mounted. These rotors are provided with intermeshing tooth blades 4 which cooperate upon rotation to provide expanding pockets to which motive fluid pressure may be admitted to effect operation of the motor. The housing 1 is closed at opposite ends by heads 5 and 6; and of these heads the head 5 is provided with a shaft 7 which is journaled in a suitable bearing 8 in a hanger 9 formed upon a suitable supporting frame 10 at whose opposite end a second hanger 11 is arranged. Suitable fluid pressure supply means of any type is shown at 12. The motor housing member 1 is provided at one end with a laterally extended collar 13 having formed thereon a braking surface 14 with which a brake band 15 cooperates under the control of manually applied braking mechanism 16, herein of the toggle type and of a well known commercial construction. This braking means may serve to hold the motor casing stationary when the brake band 15 is placed under tension, or will permit the motor casing to rotate when the brake is slacked off. Rotatably mounted upon the exterior of the casing 1 is a drum 17 upon which a flexible haulage member 18 is wound. This drum is provided at both ends with suitable guiding flanges for the haulage member, these flanges being designated 19; and the flange 19 remote from the flange 13 on the motor housing, has an annular member 20 formed thereon with whose exterior periphery a brake band 21 cooperates under the control of a manual brake applying means 22. The outer end of the flange member 20 has attached thereto a head member 23 which is secured thereto by bolts 24 and which is provided with a centrally disposed collar or sleeve 25 journaled in the hanger 11. The head 6 of the motor housing is provided with a projecting shaft 26 which is journaled in a suitable bearing 27 within the sleeve or collar member 25. The rotor 2 of the motor drives a pinion 28 which in turn drives a pinion 29 mounted upon a shaft 30 carried in the housing, and rotation of the shaft 30 causes rotation of the pinion 31 carried thereby which meshes with a larger pinion 32. The pinion 32 is mounted upon a shaft 33 journaled in the head 6 and extending there-through; and this shaft carries outside the head 6 a pinion 34 which meshes with a driving pinion 36 which is rotatable upon a stub shaft 37 rigidly secured to the head 6. The pinion 36 meshes with an internal gear 38 which is formed or otherwise suitably secured within the interior of the flange 20. Suitable vents for exhaust fluid are provided.

From the foregoing description the mode of operation of my improved hoisting mechanism will be readily apparent. Fluid pressure having been admitted to the inlet port by way of the inlet means 12, the rotors 2 and 3 are caused to rotate in opposite directions by the action of the fluid in the tooth pockets between the tooth blades 4. Rotation of the rotor 2 drives the pinion 28 which, through the pinions, 29, 31, 32, 34, 36 will drive the internal gear 38 and thereby drive the drum 17, if the brake band 15 is holding the motor casing 1 stationary and the brake band 21 is released. If, on the other hand, the brake band 21 is applied and the brake band 15 released, it will be clearly evident that the drum will be held against rotation while the motor housing will rotate as the rotors revolve within the drum 17. It will thus be apparent that my improved hoisting mechanism can be controlled, not only by controlling the supply of fluid to the rotors, but also while the motor is running can be fully controlled by the use of the brake bands 15 and 21. It will be noted that when the motor is held stationary, the drum will rotate and vice versa and that the axes of the rotors will trace surfaces of revolution when the motor casing rotates about its axis.

While I have in this application specifically described one form which my invention may assume in practice, it will be understood that this form of the same is shown for purposes of illustration and that the invention may be modified and embodied in various forms without departing from its spirit or the scope of the appended claims.

What I claim as new and desire to secure by Letters Patent is:

1. In a hoisting mechanism, a rotatably mounted motor casing, a power generating motor in said casing, a drum journaled on the periphery of said motor casing, driving connections between said motor and drum, and operator-controllable means for holding the casing against rotation to effect rotation of the drum through said driving connections.

2. In a hoisting mechanism, a motor having a rotatable casing and intermeshing rotors therein rotating on axes which upon rotation of the motor casing trace surfaces of revolution, a drum surrounding the periphery of said casing, driving gearing between said drum and one of said rotors, operator-controllable means for holding said motor casing against rotation to effect rotation of said drum, and braking means for said drum.

3. In a hoisting mechanism, a rotatably mounted motor having intermeshing rotors rotating on axes which upon rotation of the motor trace surfaces of revolution, a drum surrounding the periphery of said motor, driving gear between said drum and motor, means for braking said motor to hold the same stationary to effect rotation of said drum, and braking means for said drum, said mechanism being operative upon application of said drum braking means and release of said motor to effect rotation of the motor idly within the drum.

4. In a hoisting mechanism, a drum, an expansible chamber motor of the rotary type disposed coaxially with respect to the drum and at least partially contained therein, said motor having a rotatable casing and intermeshing rotors therein rotatable on axes parallel to the axis of said drum and spaced therefrom and tracing surfaces of revolution on rotation of the motor casing, driving connections between said drum and motor including a gear whose axis is offset from the drum axis arranged between the drum and motor, and independent braking means for the drum and motor casing, respectively controllable to hold the drum and the casing stationary, whereby when either is braked the other will rotate.

5. A hoisting mechanism comprising a rotatable drum, a movable motor casing having a portion surrounded by said drum, reduction gearing carried within said casing, a gear carried on the outside of and by said casing and operatively connected to said other gearing, a gear carried by said drum, said outside gear meshing with said drum gear, and operator controlled means for holding said motor casing against movement or releasing it at will.

6. A hoisting mechanism comprising a rotatable drum, a motor having a rotatable casing disposed within said drum and a motor rotor offset from the drum axis, said drum being always movable relative to said casing during motor operation due to power medium flow to said motor, operator controlled means for controlling rotation of said casing, reduction gearing between said motor and drum including gears carried within said casing and driven directly from said offset rotor, a gear carried on the outside of and by said casing and operatively connected to said gears in the casing and a gear carried by said drum and meshing with said outside gear, and means for supporting said drum at a point at each side of said drum gear.

7. In a hoisting mechanism, a coaxially mounted drum and motor, said motor being disposed within said drum and comprising a rotatable casing and a plurality of intermeshing rotors therein, means for transmitting power from said rotors to said drum, and operator controlled means to hold said casing when said power is transmitted.

8. In a hoisting mechanism, a motor having a power shaft and a rotatably supported casing member, a rotatably supported winding drum member arranged coaxially with said rotatably supported casing member and in overlapping relation thereto, a gear connected in fixed coaxial relation to one of said members, a gear meshing with said first mentioned gear and so connected with the other of said members that it traverses an orbit on rotation of said member, means connecting said shaft in driving relation to said second gear, and means for selectively holding stationary either said casing member or said drum member while said motor power shaft is rotating.

9. In a hoisting mechanism, a motor having a power shaft and a rotatably supported casing member, a rotatably supported winding drum member arranged coaxially with said rotatably supported casing member and in overlapping relation thereto, a gear so connected to one of said members that rotation thereof is accompanied by rotation of said member, a gear meshing with said first mentioned gear and orbitally movable about the axis of the latter, said second gear so connected to the other of said members that its orbital movement is accompanied by rotation of said other member, means connecting said shaft in driving relation to said second gear, and means for selectively holding stationary either said casing member or said drum member while said motor power shaft is rotating.

10. In a hoisting mechanism, a motor having a power shaft and a rotatably supported casing member, a rotatably supported drum member in coaxial overlapping relation to said casing member, means for holding either of said members stationary at will, and a driving train, including an element rotatable on an axis offset from the axis of each of said members and driven from said power shaft, for effecting rotation of either of said members when the other is held against rotation.

11. In a hoisting mechanism, a motor having a power shaft and a rotatably supported casing member, a rotatably supported drum member in coaxial overlapping relation to said casing member, means for holding either of said members stationary at will, and a driving train driven from said power shaft for effecting rotation of either of said members when the other is held against rotation.

12. In a hoisting mechanism, a rotatable drum member, a motor having a power shaft and a rotatable casing member, said casing member and said drum member being coaxial and so disposed with relation to each other that a plane perpendicular to the axis of said drum member and cutting the winding surface of the latter also cuts said motor casing member, and means having power supplied thereto by said power shaft for driving said members, including means for selectively holding either member against rotation, the member held acting as reaction means for the member being driven.

13. In a hoisting mechanism, a rotatable drum member, a motor having a power shaft and a rotatable casing member, said casing member and said drum member being coaxial and so disposed with relation to each other that a plane perpendicular to the axis of said drum member and cutting the winding surface of the latter also cuts said motor casing member, operative driving connections between said shaft and said members in which one member acts as reaction means for the other member, and means for selectively holding either member against rotation whereby rotation of the other member is produced.

14. In a hoisting mechanism, a winding drum, a driving motor therefor having a rotatable casing, and means for producing rotation of said drum by said motor including operative driving connections between said motor and drum and braking means for holding said casing, the periphery of said casing providing a bearing surface for rotatably supporting said drum.

In testimony whereof I affix my signature.

LOUIS A. MAXSON.